(12) United States Patent
Arasachetty et al.

(10) Patent No.: US 10,826,985 B2
(45) Date of Patent: Nov. 3, 2020

(54) SYSTEM AND METHOD FOR CONTENT TETHERING IN AN ENTERPRISE CONTENT MANAGEMENT SYSTEM

(71) Applicant: ORACLE INTERNATIONAL CORPORATION, Redwood Shores, CA (US)

(72) Inventors: Bhageerath Arasachetty, Bangalore (IN); Praveen Kumar Jayaram, Bangalore (IN); Shyam Babu Prasad, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/669,423

(22) Filed: Aug. 4, 2017

(65) Prior Publication Data

US 2019/0045002 A1 Feb. 7, 2019

(51) Int. Cl.
*G06F 15/16* (2006.01)
*H04L 29/08* (2006.01)
*H04L 29/06* (2006.01)

(52) U.S. Cl.
CPC .......... *H04L 67/1095* (2013.01); *H04L 67/26* (2013.01); *H04L 67/2804* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,499,934 B2 | 3/2009 | Zhang et al. | |
| 7,975,218 B2 | 7/2011 | Suzuki | |
| 8,127,225 B2 | 2/2012 | Petri | |
| 2007/0110231 A1* | 5/2007 | Bales | H04L 63/10 380/30 |

(Continued)

OTHER PUBLICATIONS

"Linking Documents Together", https://www.filehold.com/help/user/linking-documents, 3 pages, retrieved Jan. 31, 2017.

(Continued)

*Primary Examiner* — Mohamed Ibrahim
(74) *Attorney, Agent, or Firm* — Tucker Ellis LLP

(57) ABSTRACT

In accordance with an embodiment, described herein is a system and method for enabling content tethering for a content management system. A content tethering component can receive an indication to link (tether) content items of a content management system to one another, and associates the content items in a hierarchical structure according to the linking. Content items can exist and evolve independently, can be placed under different folder hierarchies, and can be managed by the same or different users. The hierarchical structure can indicate relationships between linked content items, and notify users associated with linked items in response to events (e.g., modifications or deletions) affecting those documents. A security data can be used to determine permissions and privileges for particular users with respect to particular items. In an embodiment, the content tethering component can be provided as a pluggable module for use with existing content management systems.

20 Claims, 11 Drawing Sheets

(56) References Cited

U.S. PATENT DOCUMENTS

| | | | |
|---|---|---|---|
| 2008/0077631 A1 | 3/2008 | Petri | |
| 2009/0077110 A1* | 3/2009 | Petri | G06F 16/2365 |
| 2009/0106271 A1 | 4/2009 | Chieu et al. | |
| 2011/0288946 A1* | 11/2011 | Baiya | G06F 21/10 |
| | | | 705/26.1 |
| 2012/0284225 A1 | 11/2012 | Man et al. | |
| 2013/0205251 A1 | 8/2013 | Cisler et al. | |
| 2015/0026218 A1 | 1/2015 | Eckel et al. | |
| 2016/0335280 A1 | 11/2016 | Shmerl | |

OTHER PUBLICATIONS

"Advanced Searches (Metadata Search)", https://www.filehold.com/help/user/advanced-searches, 4 pages, retrieved Feb. 1, 2017.

"Document Alerts", https://www.filehold.com/help/user/document-folder-alerts, 3 pages, retrieved Feb. 1, 2017.

"FileHold Software—The Management of Documents and Records from Creation to Disposition", http://www.partnerpoint.com/uploads/curriculum-vitae/filehold-systems-inc-433.pdf, 4 pages.

"Features Every Enterprise Document Management Software Must Have", http://www.itaz.com/globodox-articles/features-every-enterprise-document-management-software-must-have/, 4 pages, retrieved Jan. 30, 2017.

"Globodox Document Management Software Features", http://www.itaz.com/globodox-features/, 5 pages, retrieved Jan. 31, 2017.

"EZContentManager", https://docs.google.com/viewerng/viewer?url=http://acom.com/wp-content/uploads/2015/09/EZCM-Basic-Brochure.pdf, 2 pages, 2012.

"Acom EZCM", http://acom.com/pdf/iSeries_06/DS_iSeries_EZCM.pdf, 2 pages, Sep. 2008.

"Configuring for linking Content Manager documents to SAP by processing their bar codes", http://www.ibm.com/support/knowledgecenter/en/SSRW2R_3.0.0/com.ibm.iccsap.doc/doc/c_env_docs_link_cme_barcode.html, 2 pages, retrieved Feb. 1, 2017.

"OmniDocs Enterprise Content Management (ECM) Suite", http://www.newgensoft.com/products/enterprise-content-management-omnidocs/, 9 pages, 2017.

* cited by examiner

SYSTEM AND METHOD FOR CONTENT TETHERING IN AN ENTERPRISE CONTENT MANAGEMENT SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to content tethering, and are particularly related to a system and method for enabling content tethering for a content management system.

BACKGROUND

Content management systems enable content to be created, uploaded, accessed, and modified by a plurality of users. For example, a content item such as a document can be created and uploaded by one user, and subsequently accessed and modified by other users. Additionally, a single document can be accessed (e.g., viewed) concurrently by multiple users. Content management systems can be useful for enterprises in which, for example, several individuals collaborate on a project by accessing the same document or set of documents.

Complexities can arise, however, when newer versions of documents are created and some users are not aware of the newer version, when different users place related documents under different folder hierarchies, or when a document relied upon by one or more users is deleted by another user.

SUMMARY

In accordance with an embodiment, described herein is a system and method for enabling content tethering for a content management system. A content tethering component can receive an indication to link (tether) content items of a content management system to one another, and associates the content items in a hierarchical structure according to the linking. Content items can exist and evolve independently, can be placed under different folder hierarchies, and can be managed by the same or different users. The hierarchical structure can indicate relationships between linked content items, and notify users associated with linked items in response to events (e.g., modifications or deletions) affecting those documents. A security data can be used to determine permissions and privileges for particular users with respect to particular items. In an embodiment, the content tethering component can be provided as a pluggable module for use with existing content management systems.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

As described above, in content management systems complexities can arise, however, when newer versions of documents are created and some users are not aware of the newer version, when different users place related documents under different folder hierarchies, or when a document relied upon by one or more users is deleted by another user.

In accordance with an embodiment, described herein is a system and method for enabling content tethering for a content management system. A content tethering component can receive an indication to link (tether) content items of a content management system to one another, and associates the content items in a hierarchical structure according to the linking. Content items can exist and evolve independently, can be placed under different folder hierarchies, and can be managed by the same or different users. The hierarchical structure can indicate relationships between linked content items, and notify users associated with linked items in response to events (e.g., modifications or deletions) affecting those documents. A security data can be used to determine permissions and privileges for particular users with respect to particular items. In an embodiment, the content tethering component can be provided as a pluggable module for use with existing content management systems.

Figure 1:
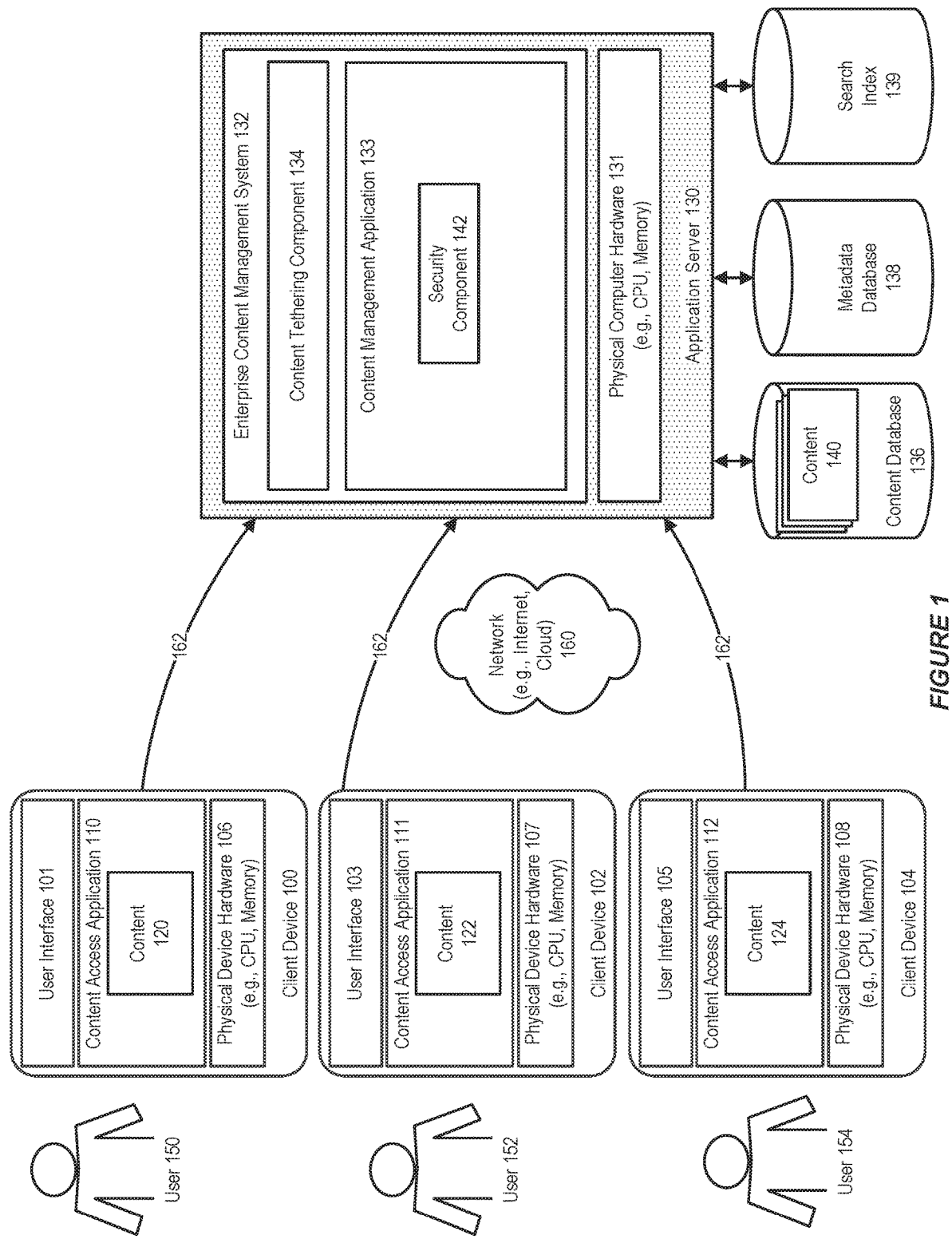
FIG. 1 illustrates a system for enabling content tethering for a content management system, in accordance with an embodiment.

FIG. 1 illustrates a system for enabling content tethering for a content management system, in accordance with an embodiment.

As illustrated in FIG. 1, in accordance with an embodiment, for each of a plurality of client devices 100, 102, and 104 having a user interface 101, 103, 105 and physical device hardware 106, 107, 108 (e.g., CPU, memory), the client device can be provided with a content access application 110, 111, 112 for execution thereon.

In accordance with an embodiment, the client device can communicate 162 with an application server 130 that includes a physical computer hardware 131 (e.g. CPU, memory) and an enterprise content management system 132.

In accordance with an embodiment, the content access application at the client device can communicate with the enterprise content management system via a network 160 (e.g., the Internet, or a cloud environment). The content access application can be configured to enable a user 150, 152, 154 to view, upload, modify, delete, or otherwise access content such as content items 120, 122, 124 at each client device. For example, new content can be added or uploaded to the enterprise content management system by a user interacting with the content access application on an associated client device. The content can be transmitted to the enterprise content management system for storage.

In accordance with an embodiment, the enterprise content management system can be or include a platform for consolidating content that can be managed by a plurality of users of an enterprise. In accordance with an embodiment, the enterprise content management system can be configured to communicate with a content database 136 for storing content (or content items) 140, and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata with the content. Metadata can include information about an item of content, such as its title, author, release date, historical data such as who has accessed the item and when, a location where the content is stored, and the like.

In accordance with an embodiment, the metadata can be stored in a metadata database 138. In accordance with an embodiment, the enterprise content management system can be configured to communicate with the metadata database to access metadata stored therein, and to store metadata generated by the content tethering component in the metadata database.

In accordance with an embodiment, the enterprise content management system can also be configured to communicate with a search index 139. The search index can be configured to provide indexing and searching of content and data stored in the content database and the metadata database. In accordance with an embodiment, the search index can be a relational database management system (RDBMS) or a search tool such as Oracle Secure Enterprise Search (Oracle SES).

In accordance with an embodiment, content stored within the content database can be checked out for modification by a user at the user's client device, and checked back in to the enterprise content management system.

In accordance with an embodiment, a checked out document can be locked while checked out to a particular user, to prevent other users from modifying the checked out document. However, the system can be configured to permit viewing of the document by other users while it is checked out. In accordance with an embodiment, new versions of content can be created and stored in the content database of the enterprise content management system.

In accordance with an embodiment, the content tethering component can be configured to provide an option to link content items, and to associate the content items in a hierarchical structure with 1:N links.

In accordance with an embodiment, linked content items can exist and evolve independently, can be placed under different folder hierarchies within the enterprise content management system, and can be managed by the same or different users. The content tethering component can be configured to notify users associated with linked documents in response to events (e.g., modifications, deletions) affecting those documents.

In accordance with an embodiment, the content tethering component can be provided as an independent pluggable module for use with one or more existing content management systems, including the enterprise content management system 132.

In accordance with an embodiment, the enterprise content management system can further include a content management application 133 including a security component 142. The security component can include or store a security data including user permissions and privileges with respect to particular items of content and/or particular actions. For example, the security data can indicate that certain users are permitted to access and/or modify certain documents. As another example, the security data can indicate that only certain users are permitted to create links between content items, to modify certain content items, or to delete content items.

In accordance with an embodiment, the content tethering component can be configured to communicate or otherwise have visibility into the metadata database and the security component of the enterprise content management system. The content tethering component can be configured to add metadata describing the relationships between content items and can use metadata to determine events (e.g., search, modification, deletion) affecting linked content items.

For example, in accordance with an embodiment, the content tethering component can use data from the security component to validate a user before and/or during link creation, and before and/or during link deletion, according to the user's permissions. As another example, the content tethering component can use data from the security component to determine particular users who are permitted to access particular documents, and to permit link or other hierarchical structure visibility for those documents to only those users.

Figure 2:
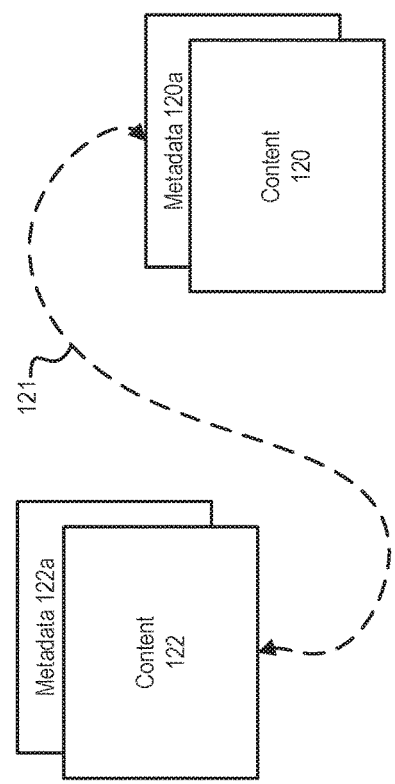
FIG. 2 illustrates linking between content items, in accordance with an embodiment.

FIG. 2 illustrates linking between content items, in accordance with an embodiment.

As illustrated in FIG. 2, an item of content 122 and its associated metadata 122a can be associated with an item of content 120 and its associated metadata 120a. The association between the content items is represented in FIG. 2 by a link 121. The link can be provided by the content tethering component in response to a user input from, for example, a user who has access to one or both of the content items.

In accordance with an embodiment, a user can specify a parent-child or parent-children relationship between content items, such that a particular content item can be designated as a parent of one or more child content items. For example, the content tethering component can be configured to designate the content item 120 as a parent of the content item 122, and designate the content item 122 as a child of the content item 122. The content tethering component can be configured to generate metadata indicating the parent-child relationship.

In accordance with an embodiment, a link or association can be created between one content item and a plurality of content items, or between a plurality of content items and another plurality of content items. Linked content items can be associated with one another according to a hierarchical structure with 1:N or X:N links.

In accordance with an embodiment, the content 120, 122 can be stored in a content database at a server and the metadata 120*a*, 122*a* can be stored in a metadata database at the server. Data relating to (or describing) the link, and which user created the link, can also be included as part of the metadata 122*a* and 120*a*.

In accordance with an embodiment, the content tethering component can be configured to access metadata for a plurality of content items (e.g., by communicating with the database where the metadata is stored), and use the metadata to provide links (or relationships) between content items.

In accordance with an embodiment, the content tethering component can also be configured to access security data (e.g., by communicating with the database where the security data is stored), to determine permissions and privileges of particular users with respect to particular items of content.

For example, in accordance with an embodiment, certain users can be permitted to create links for certain documents, while other users are not permitted to do so. Additionally, certain users can be permitted to break or remove links for certain documents, while others are not permitted to do so.

In accordance with an embodiment, links between certain documents (or between any documents) can be made visible to only certain users, while other users are not permitted to view the links.

In accordance with an embodiment, the content tethering component can be configured to validate that the user has permission to link content items 122 and 120, before or during the providing of the link.

Figure 3:
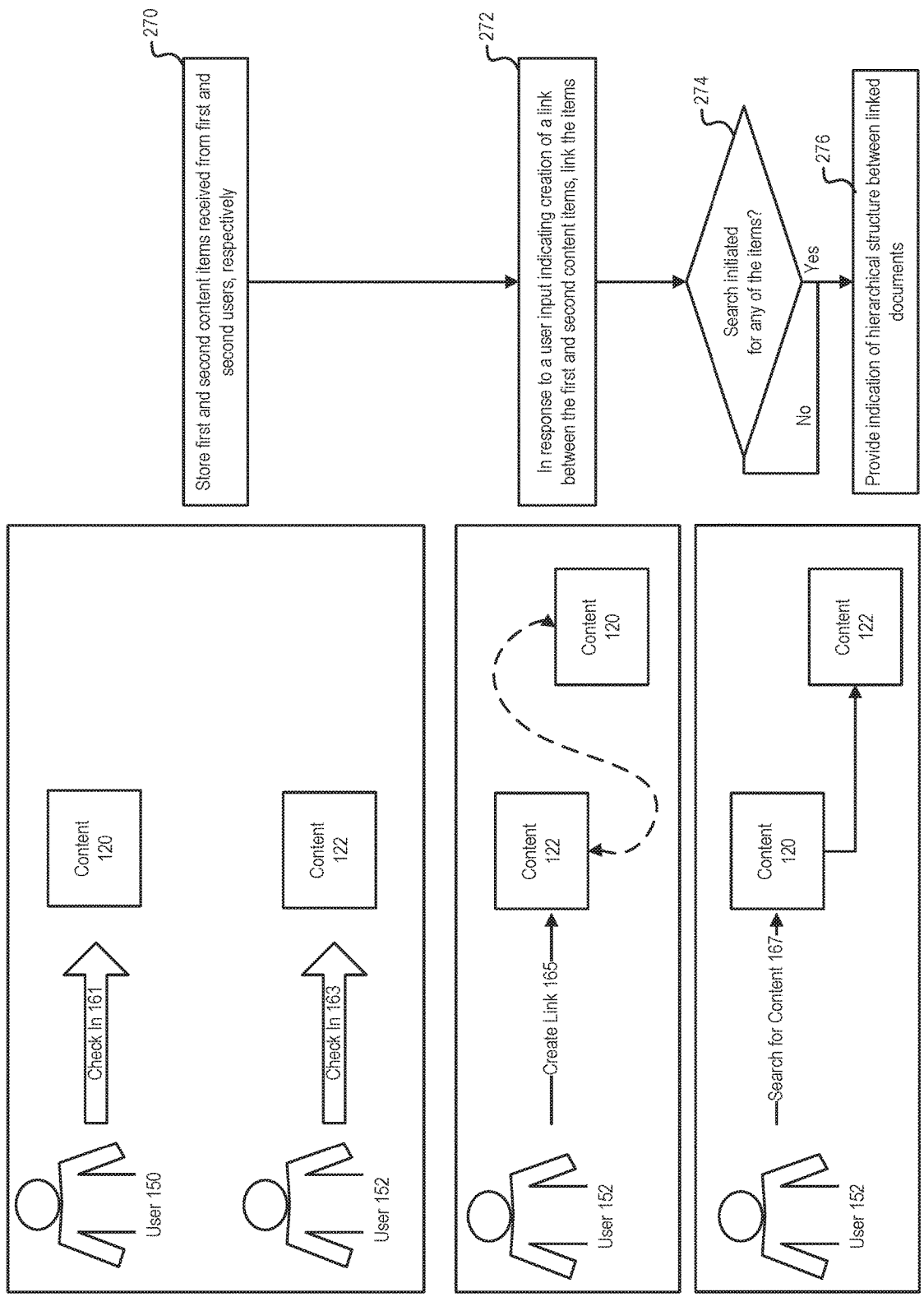
FIG. 3 illustrates enabling content tethering for a content management system, in accordance with an embodiment.

FIG. 3 illustrates enabling content tethering for a content management system, in accordance with an embodiment.

As illustrated in FIG. 3, at operation 270, the content management system can store a first content item received from a first user and a second content item received from a second user.

For example, the content management system can receive first content item 120 from a first user 150 and second content item 122 from a second user 152. The first content and the second content can be received in response to the first user checking in 161 the first content item and the second user checking in 163 the second content item.

In accordance with an embodiment, at operation 272, in response to a user input indicating creation of a link between the first and second content items, the content tethering component provides a link between the items.

For example, in response to the second user 152 creating 165 a link between content items 122 and 120, the content tethering component can provide a link between the content items 122 and 120. Alternatively, the link can be created by a user other than the second user 152, such as a different user who has accessed the content item 122, or a user associated with the content item 120.

In accordance with an embodiment, the content tethering component can be configured to associate the linked content items according to a hierarchical structure with 1:1 links.

In accordance with an embodiment, providing the link can include associating metadata corresponding to content item 122 with metadata corresponding to content item 120. The content tethering component can further be configured to generate data relating to (or describing) the link, and transmit the data to the content management system for inclusion as part of the metadata for each linked content item.

In accordance with an embodiment, an operation 274, the system determines that a search has been initiated for one of the content items.

For example, in accordance with an embodiment, the system can be configured to receive, in response to a user input from the user 152 indicative of a search of the content management system for a particular document such as content item 120, a request for the particular document. In accordance with an embodiment, the search can also be initiated by a user who is not associated with any of the linked documents.

In accordance with an embodiment, at operation 276, the content tethering component can be configured to, in response to the request, provide an indication of the hierarchical structure between the linked content items.

For example, in accordance with an embodiment, in response to the request for the particular content item 122, the content tethering component can provide to the user who initiated the search an indication of the hierarchical structure between the searched-for content item 122 and the linked content item 120.

In accordance with an embodiment, the indication can be transmitted to a client device of the user who initiated the search, to be displayed at the user interface of the client device. In accordance with an embodiment, the indication can be displayed at the user interface concurrently with the search results provided as a result of the user's search for content item 120.

Figure 4:
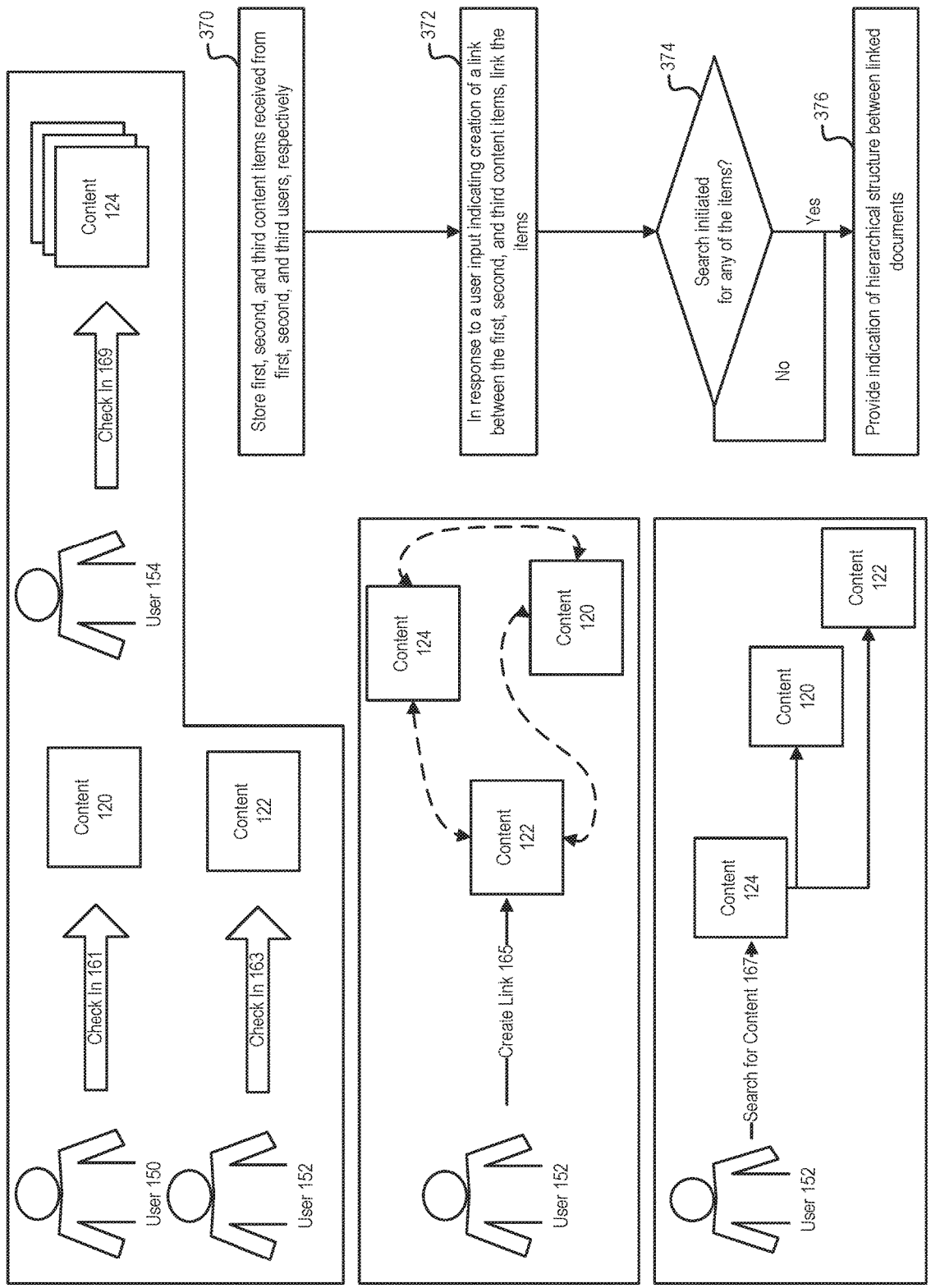
FIG. 4 illustrates enabling content tethering for a content management system, in accordance with an embodiment.

FIG. 4 illustrates enabling content tethering for a content management system, in accordance with an embodiment.

As illustrated in FIG. 4, at operation 370, the content management system can store first, second, and third content items received from a first, second, and third user, respectively.

For example, the content management system can receive first content item 120 from a first user 150, second content item 122 from a second user 152, and third content item 124 from a third user 154. The first, second, and third content items can be received in response to the first user checking in 161 the first content item, the second user checking in 163 the second content item, and the third user checking in 169 the third content item.

In accordance with an embodiment, at operation 372, in response to a user input indicating creation of a link between the first, second, and third content items, the content tethering component provides a link between the items.

For example, in response to the second user 152 creating 165 a link between content items 122, 124, and 120, the content tethering component can provide a link between the content items 122, 124, and 120. Alternatively, the link can be created by a user other than the second user 152, such as a different user who has accessed the content item 122, or a user associated with the content item 120 or content item 124.

In accordance with an embodiment, the content tethering component can be configured to associate the linked content items according to a hierarchical structure with 1:2 links.

In accordance with an embodiment, the link can include different portions or segments, including a portion linking content items 122 and 124, a portion linking content items 124 and 120, and a portion linking content items 122 and 120. In accordance with an embodiment, the same user or a plurality of different users can create each link portion.

In accordance with an embodiment, providing the link can include associating metadata corresponding to content item 122 with metadata corresponding to content item 120 and metadata corresponding to content item 124. The content tethering component can further be configured to generate data relating to (or describing) the link, and transmit the data to the content management system for inclusion as part of the metadata for each linked content item.

In accordance with an embodiment, an operation 374, the system determines that a search has been initiated for one of the content items.

For example, in accordance with an embodiment, the system can be configured to receive, in response to a user input from the user 152 indicative of a search of the content management system for a particular document such as content item 124, a request for the particular document. In accordance with an embodiment, the search can also be initiated by a user who is not associated with any of the linked documents.

In accordance with an embodiment, at operation 376, the content tethering component can be configured to, in response to the request, provide an indication of the hierarchical structure between the linked content items.

For example, in accordance with an embodiment, in response to the request for the particular content item 124, the content tethering component can provide to the user who initiated the search an indication of the hierarchical structure between the searched-for content item 124 and the linked content items 120 and 122.

In accordance with an embodiment, the indication can be transmitted to a client device of the user who initiated the search, to be displayed at the user interface of the client device. In accordance with an embodiment, the indication can be displayed at the user interface concurrently with the search results provided as a result of the user's search for content item 124.

Figure 5:
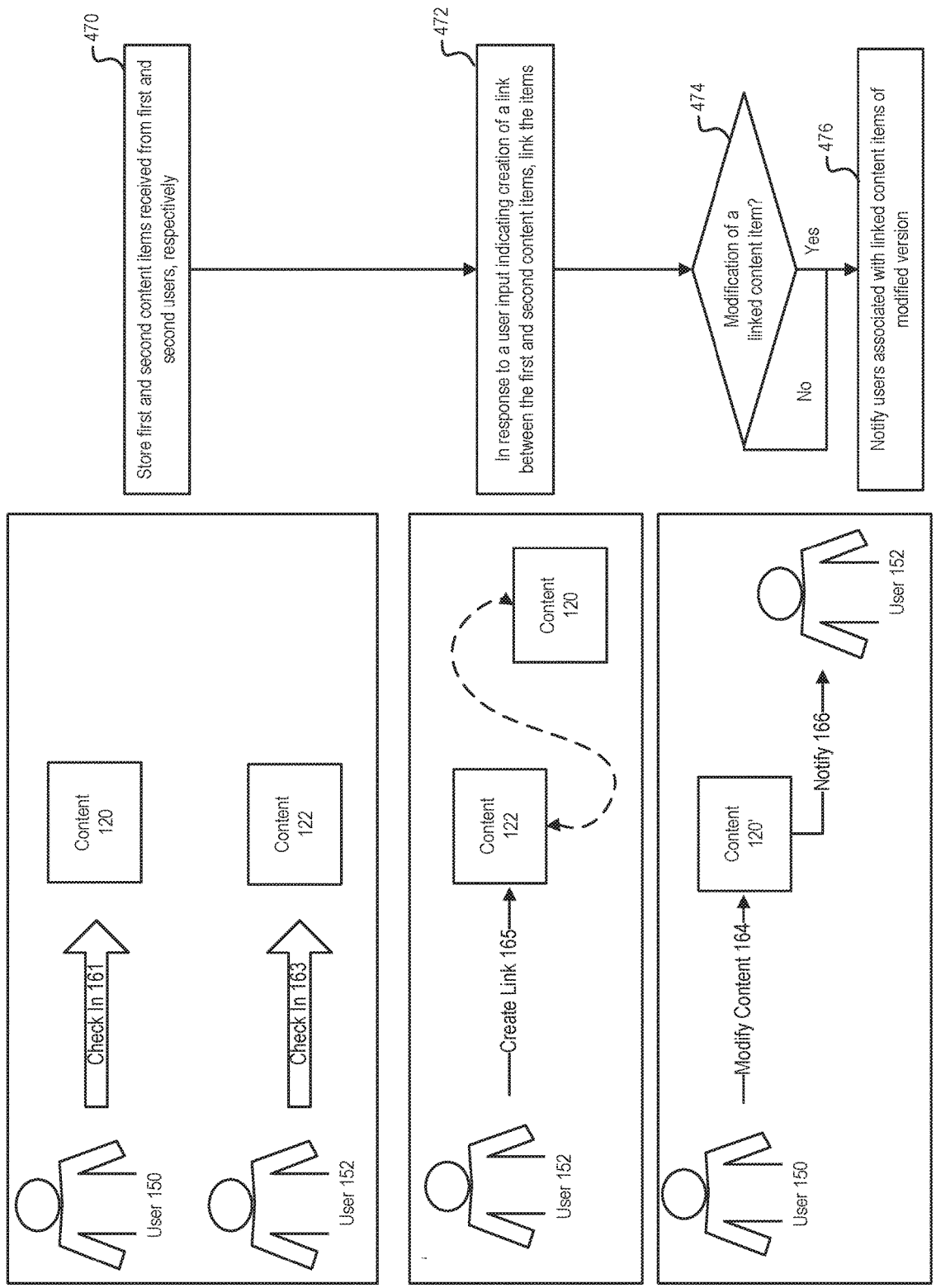
FIG. 5 illustrates enabling content tethering for a content management system, in accordance with an embodiment.

FIG. 5 illustrates enabling content tethering for a content management system, in accordance with an embodiment.

As illustrated in FIG. 5, at operation 470, the content management system can store a first content item received from a first user and a second content item received from a second user.

For example, the content management system can receive first content item 120 from a first user 150 and second content item 122 from a second user 152. The first content item and the second content item can be received in response to the first user checking in 161 the first content item and the second user checking in 163 the second content item.

In accordance with an embodiment, at operation 472, in response to a user input indicating creation of a link between the first and second content items, the content tethering component provides a link between the items.

For example, in response to the second user 152 creating 165 a link between content items 122 and 120, the content tethering component can provide a link between the content items 122 and 120. Alternatively, the link can be created by a user other than the second user 152, such as another user who has accessed the content item 122, or a user associated with the content item 120.

In accordance with an embodiment, the content tethering component can be configured to treat the linked content items according to a hierarchical structure with 1:1 links.

In accordance with an embodiment, providing the link can include associating metadata corresponding to content item 122 with metadata corresponding to content item 120. The content tethering component can further be configured to generate data relating to (or describing) the link, and transmit the data to the content management system for inclusion as part of the metadata for each linked content item.

In accordance with an embodiment, an operation 474, the system determines that one of the content items has been modified.

For example, in accordance with an embodiment, the content tethering component can determine, based on metadata associated with content item 120, that the content item 120 has been modified 164 by a user such as user 150. In accordance with an embodiment, metadata associated with the modified content item 120' can include a user identifier of the modifying user, and a date and time of the modification. In a case where a user has modified a content item and saved a new version of the content item at the content management system, the metadata can also include an indication of the new version.

In accordance with an embodiment, at operation 476, the content tethering component can be configured to, in response to determining that a modification has been made to a content item, notify users associated with linked content items of the modified version.

For example, in accordance with an embodiment, in response to determining that the content item 120 has been modified, the content tethering component can notify users associated with the linked content items, such as user 152 associated with linked content item 122, of the modified content item 120'.

In accordance with an embodiment, the notification can be presented in response to a user searching for one of the linked documents, or at another time after the modification has been made.

Figure 6:
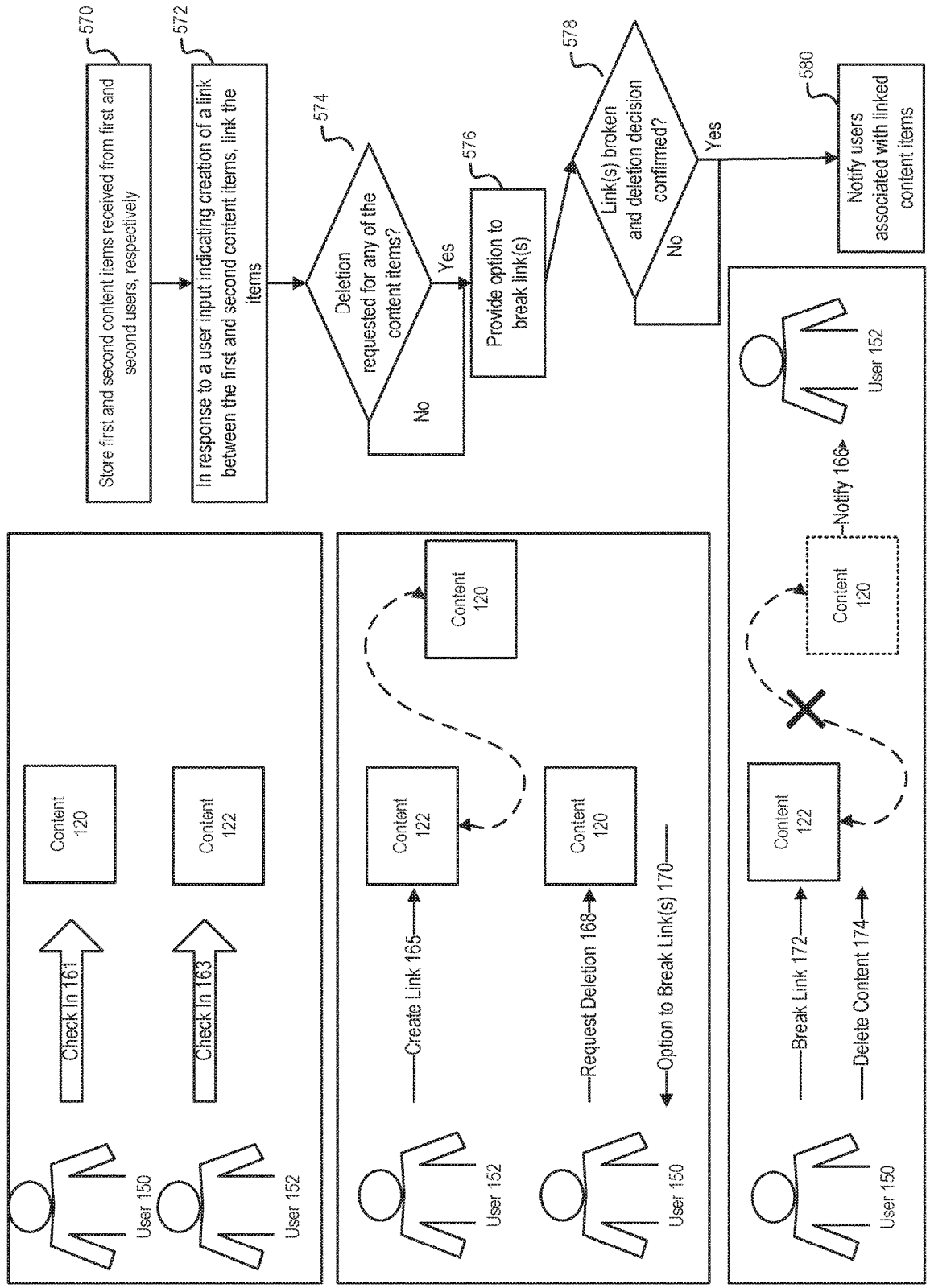
FIG. 6 illustrates enabling content tethering for a content management system, in accordance with an embodiment.

FIG. 6 illustrates enabling content tethering for a content management system, in accordance with an embodiment.

As illustrated in FIG. 6, at operation 570, the content management system can store a first content item received from a first user and a second content item received from a second user.

For example, the content management system can receive first content item 120 from a first user 150 and second content item 122 from a second user 152. The first content item and the second content item can be received in response to the first user checking in 161 the first content item and the second user checking in 163 the second content item.

In accordance with an embodiment, at operation 572, in response to a user input indicating creation of a link between the first and second content items, the content tethering component provides a link between the items.

For example, in response to the second user 152 creating 165 a link between content items 122 and 120, the content tethering component can provide a link between the content items 122 and 120. Alternatively, the link can be created by a user other than the second user 152, such as another user who has accessed the content item 122, or a user associated with the content item 120.

In accordance with an embodiment, the content tethering component can be configured to treat the linked content items according to a hierarchical structure with 1:1 links.

In accordance with an embodiment, providing the link can include associating metadata corresponding to content item 122 with metadata corresponding to content item 120. The content tethering component can further be configured to generate data relating to (or describing) the link, and transmit the data to the content management system for inclusion as part of the metadata for each linked content item.

In accordance with an embodiment, an operation 574, the system determines that deletion has been requested for one of the content items.

For example, in accordance with an embodiment, the content tethering component can determine, based on event metadata collected by the content access application or the content management system, that deletion of content item 120 has been requested 168 by a user such as user 150. In accordance with an embodiment, the event metadata can include a user identifier of the requesting user, and a date and time of the request.

In accordance with an embodiment, at operation 576, the content tethering component can be configured to, in response to determining that a deletion request has been received for a content item, provide the requesting user with an option to break one or more links associated with the content item, and proceed with the deletion.

For example, in accordance with an embodiment, in response to determining that a request to delete the content item 120 has been made by a user, the content tethering component can provide an option 170 to the requesting user 150 to break the link between content item 120 and content item 122.

In accordance with an embodiment, at operation 578, the content tethering component can be configured to determine whether the one or more links have been broken, and that the user has confirmed the decision to proceed with the deletion.

For example, in accordance with an embodiment, the content tethering component can receive a user input from the requesting user in response to the option 170, indicating that the user would like to break the link and proceed with the deletion.

In accordance with an embodiment, at operation 580, the content tethering component can be configured to notify users associated with linked content items that the links have been broken and the content item has been deleted.

For example, in accordance with an embodiment, the content tethering component can notify 166 the user 152 associated with the linked content item 122 that the link between content items 120 and 122 has been broken, and that content item 120 has been deleted.

In accordance with an embodiment, the notification can be presented in response to a user searching for one of the linked documents, or at another time after the modification has been made.

Figure 7:
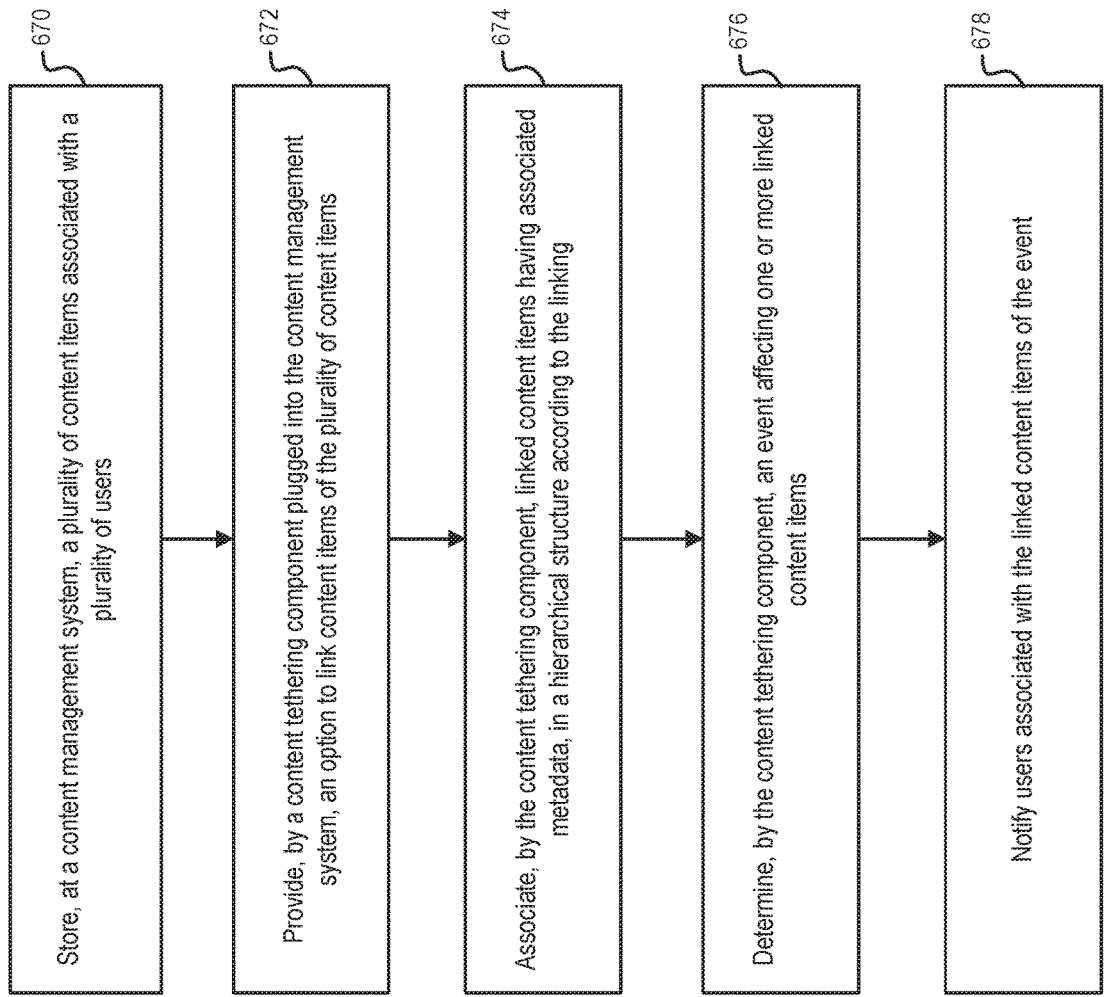
FIG. 7 illustrates a method of illustrates enabling content tethering for a content management system, in accordance with an embodiment.

FIG. 7 illustrates a method of enabling content tethering for a content management system, in accordance with an embodiment.

In accordance with an embodiment, at operation 670, the system is configured to store, at a content management system, a plurality of content items associated with a plurality of users.

In accordance with an embodiment, at operation 672, the system is configured to provide, by a content tethering component plugged into the content management system, an option to link content items of the plurality of content items.

In accordance with an embodiment, at operation 674, the system is configured to associate, by the content tethering component, linked content items having associated metadata, in a hierarchical structure according to the linking.

In accordance with an embodiment, at operation 676, the system is configured to determine, by the content tethering component, an event affecting one or more linked content items of the plurality of content items.

In accordance with an embodiment, at operation 678, the system is configured to notify users associated with the linked content items of the event.

Example Use Cases

Figure 8:
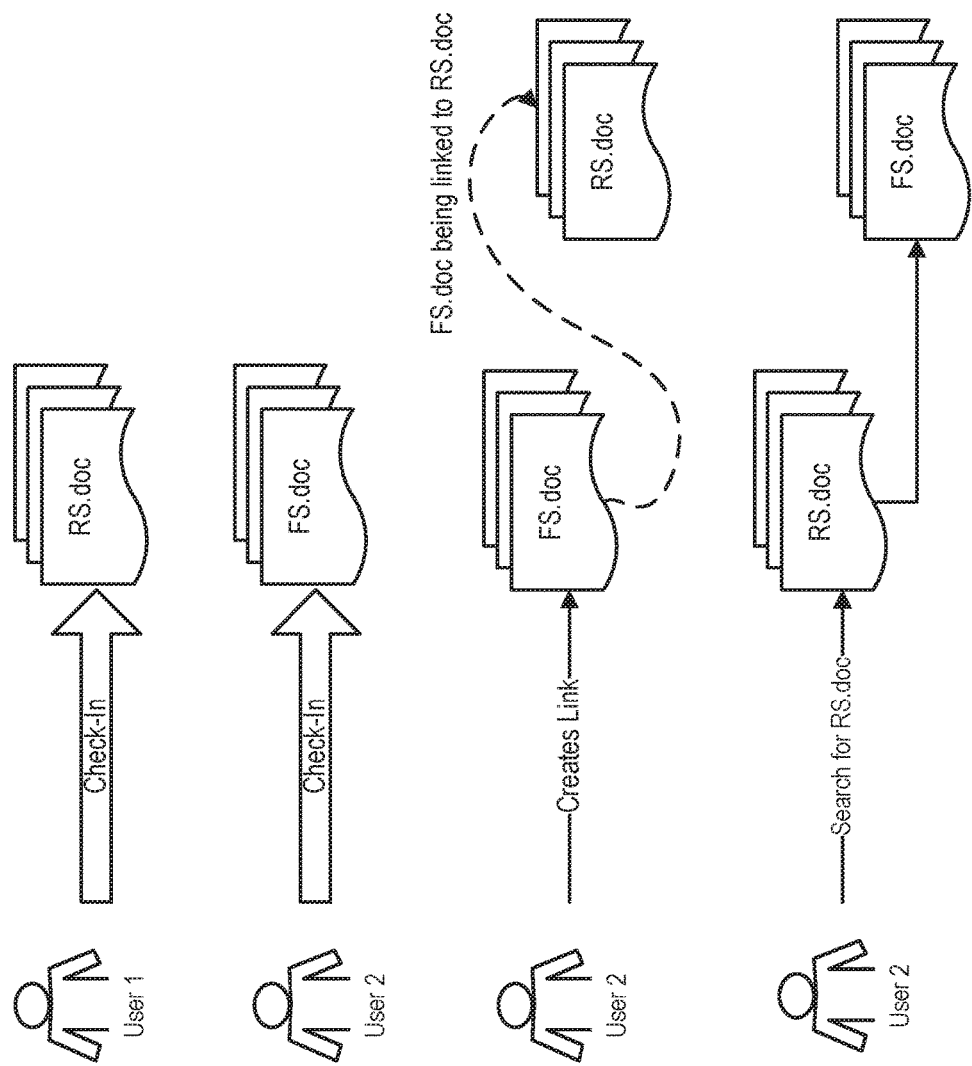
FIG. 8 illustrates enabling content tethering for a content management system, in accordance with an embodiment.

FIG. 8 illustrates enabling content tethering for a content management system, in accordance with an embodiment.

As illustrated in FIG. 8, in accordance with an example use case, User1 prepares a requirement specification document "RS.doc" and uploads the document into an enterprise content management system. User2 is continuously referring to the requirement specification document "RS.doc" and is preparing a functional specification document "FS.doc" in the enterprise content management system.

For convenience, User2 creates a link (or bond) between the "RS.doc" and "FS.doc".

After the link has been created, if User1 tries to delete the document "RS.doc", User1 will receive a notification (alert) indicating that User2 is interested in his document and that User1 needs to break the link in order to delete it.

If User1 breaks the link (or chain) and deletes the document, User2 will be notified of this deletion.

If User1 updates the document "RS.doc", User2 will be notified that the newer version of the "RS.doc" is available for him to refer.

Figure 9:
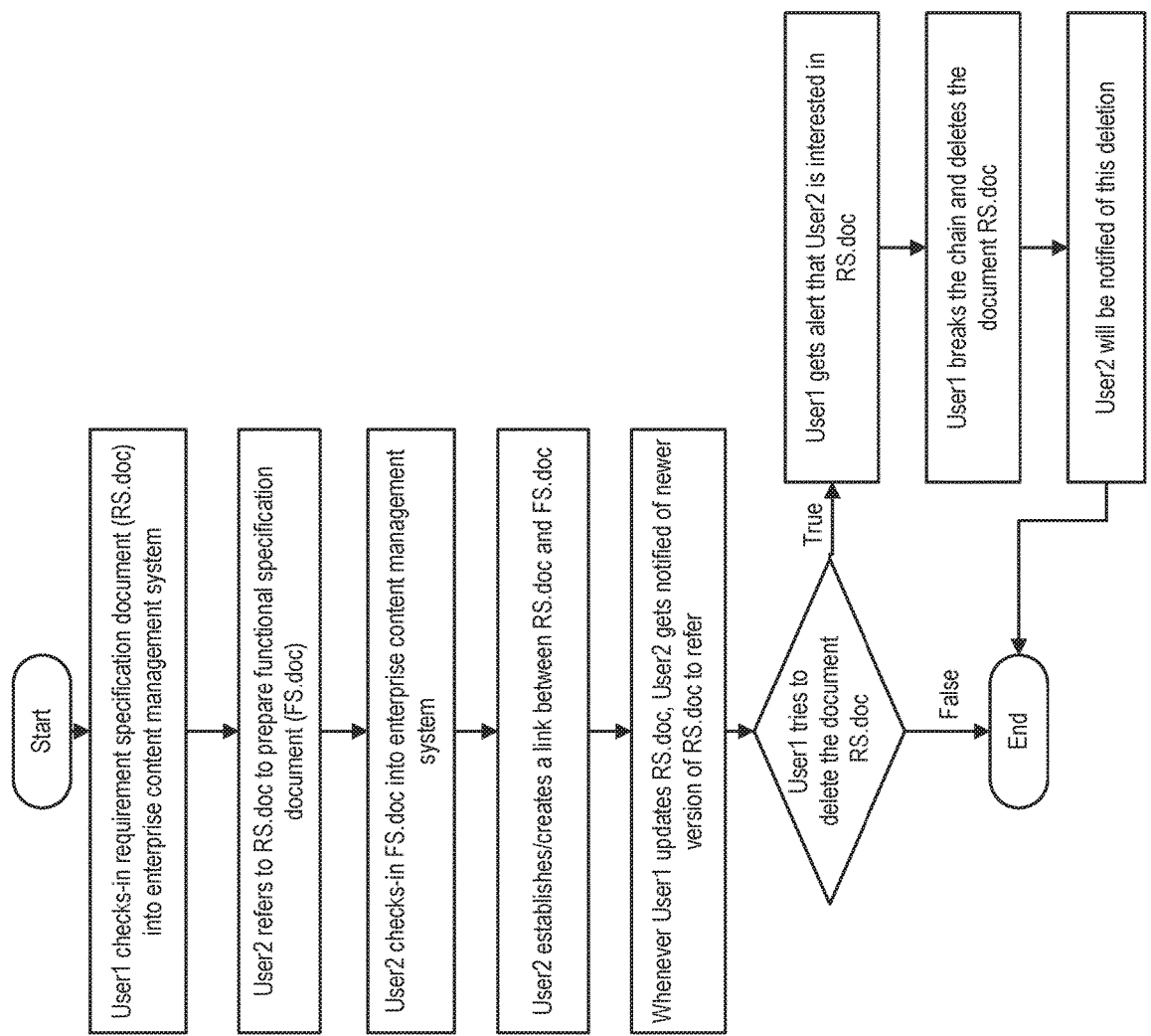
FIG. 9 illustrates a method of enabling content tethering for a content management system, in accordance with an embodiment.

FIG. 9 illustrates a method of enabling content tethering for a content management system, in accordance with an embodiment.

As illustrated in FIG. 9, in accordance with an example use case, User1 checks in a requirement specification document (RS.doc) into an enterprise content management system.

In accordance with an embodiment, a User2 refers to RS.doc to prepare another document, a functional specification document (FS.doc).

In accordance with an embodiment, User2 checks in FS.doc into the enterprise content management system.

In accordance with an embodiment, User2 establishes a link between RS.doc and FS.doc.

In accordance with an embodiment, whenever User1 updates RS.doc, User2 gets notified of the newer version of RS.doc to refer to.

In accordance with an embodiment, if User1 tries to delete the document RS.doc, User1 receives a notification (alert) that User2 is interested in RS.doc.

In accordance with an embodiment, User1 breaks the chain and deletes the document RS.doc.

In accordance with an embodiment, User2 will receive a notification of the deletion.

Figure 10:
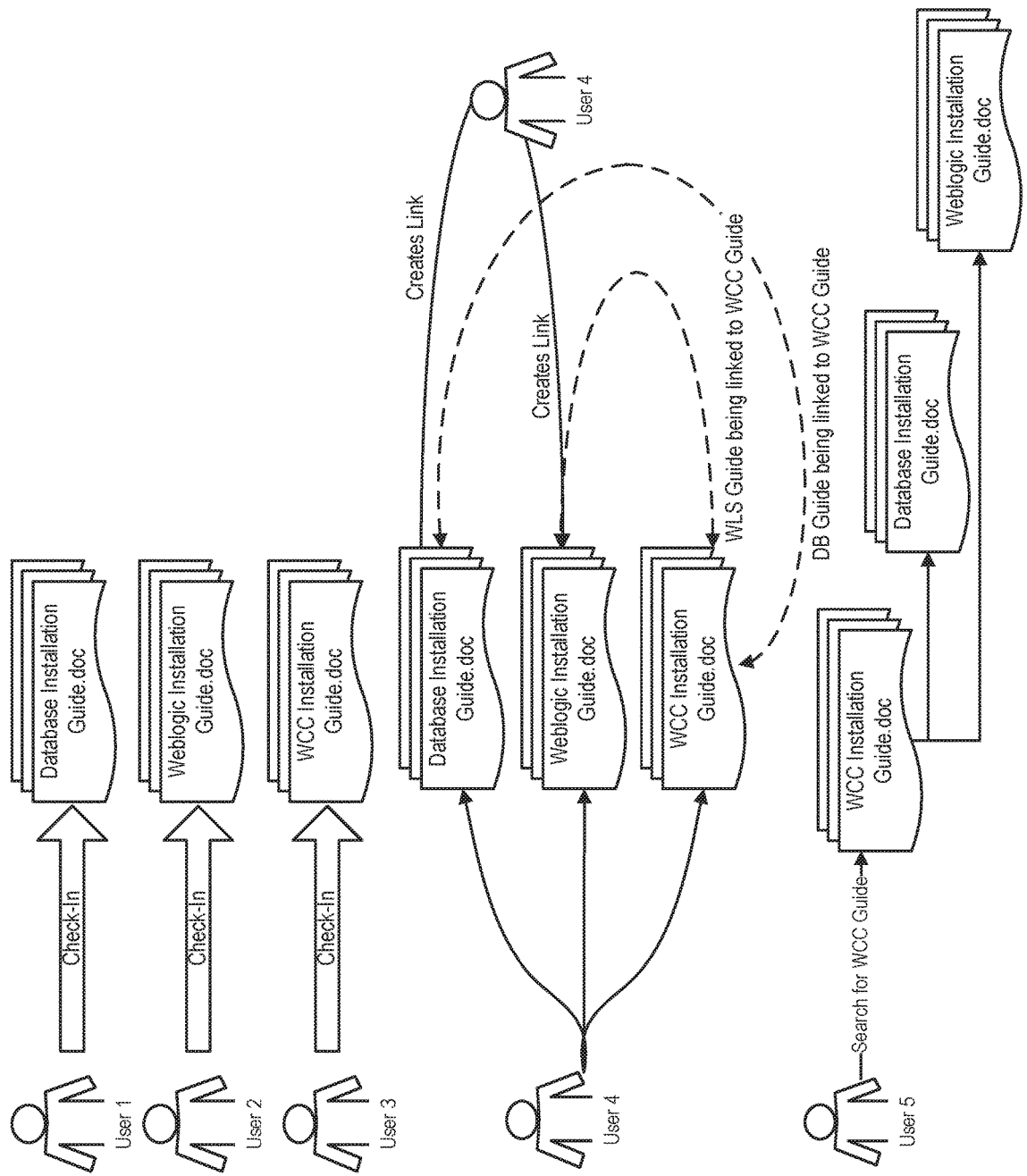
FIG. 10 illustrates enabling content tethering for a content management system, in accordance with an embodiment.

FIG. 10 illustrates enabling content tethering for a content management system, in accordance with an embodiment.

As illustrated in FIG. 10, in accordance with an example user case, User1 from a team such as the Oracle Database Team, uploads a Database Installation Guide document into an enterprise content management system.

User2 from another team, such as the Oracle BEA Weblogic Team, uploads a Weblogic Installation Guide document into the enterprise content management system.

User3 from yet another team, such as the Oracle Documents Cloud Team, uploads an Oracle WebCenter Content (WCC) Installation Guide document into the enterprise content management system.

User4 from the Oracle Documents Cloud Team performs a search for each of the three documents separately, and refers to them to set up a fresh Oracle Documents Cloud Services instance. In the process, User4 also creates a link between all three of the documents.

After the link has been created, when User5 performs a search for the Oracle WebCenter Content (WCC) Installation Guide, the linked documents for Database and Weblogic installations are displayed (listed) for easy access.

Figure 11:
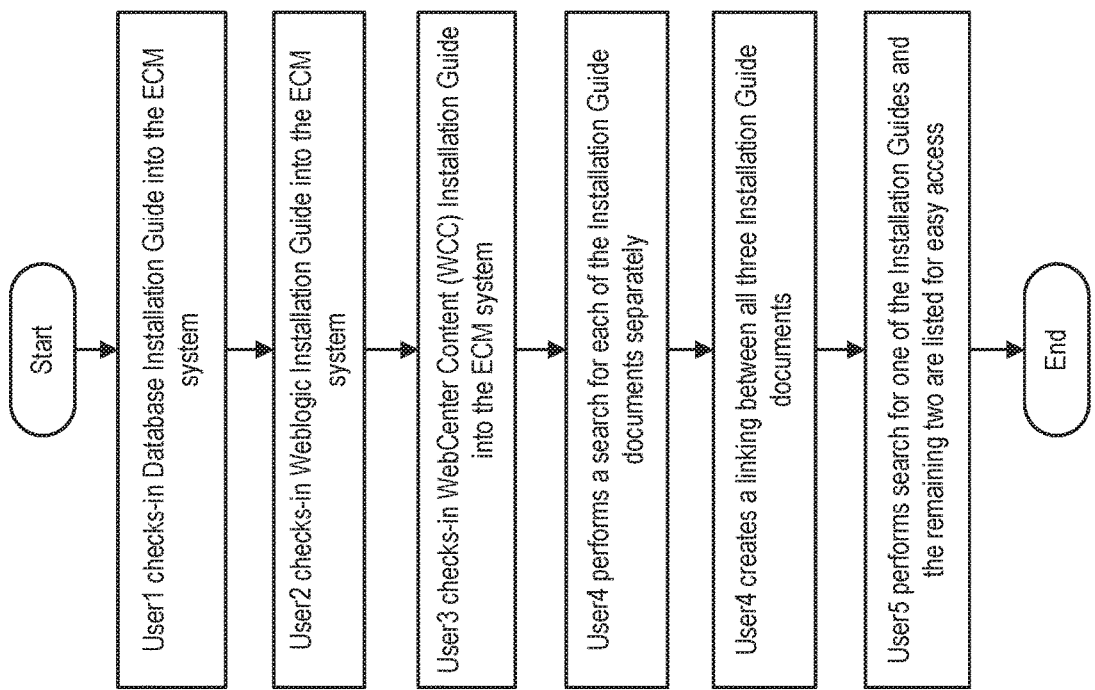
FIG. 11 illustrates a method of enabling content tethering for a content management system, in accordance with an embodiment.

FIG. 11 illustrates a method of enabling content tethering for a content management system, in accordance with an embodiment.

As illustrated in FIG. 11, in accordance with an example use case, User1 checks-in a Database Installation Guide into an enterprise content management system.

In accordance with an embodiment, User2 checks-in a Weblogic Installation Guide into the enterprise content management system.

In accordance with an embodiment, User3 checks-in a WebCenter Content Installation Guide into the enterprise content management system.

In accordance with an embodiment, User4 performs a search for each of the Installation Guide documents separately.

In accordance with an embodiment, User4 creates a link (linking) between all three of the Installation Guide documents.

In accordance with an embodiment, User5 performs a search for one of the Installation Guide documents, and the remaining two linked documents are listed for easy access.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in a cloud as part of, or as a service of, a cloud computing system based on shared, elastic resources delivered to users in a self-service, metered manner using Web technologies. Characteristics of the cloud can include on-demand self-service; broad network access; resource pooling; rapid elasticity; and measured service. Examples of cloud deployment models include: Public, Private, and Hybrid. Examples of cloud service models include Software as a Service (SaaS), Platform as a Service (PaaS), Database as a Service (DBaaS), and Infrastructure as a Service (IaaS). As used herein, the cloud can be a combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may be implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate that a link is provided in response to a user input indicative of creating a link, embodiments are not limited thereto, and the content tethering component can be configured to implement automated linking based on, for example, context tethering, where the context corresponds to metadata or collection of metadata.

Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may be incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention.

It is intended that the broader spirit and scope of the invention be defined by the following claims and their equivalents.

What is claimed is:

1. A system for enabling content tethering for a content management system, the system comprising:
    a server including a processor and the content management system, wherein the content management system is configured to store a plurality of content items associated with a plurality of users and accessible by a plurality of client devices; and
    a content tethering component in communication with the content management system, configured to:
        receive, from a client device associated with a first user, an indication to link particular content items of the plurality of content items, including a first content item received from a first user, and a second content item received from a second user;
        communicate with a security component at the content management system that provides a security data including user permissions and privileges with respect to the plurality of content items, and actions associated with those content items, to determine a user permission for the first user to link the first content item with the second content item; and
        responsive to the first user being permitted, associate the particular content items including each of the first content item and the second content item, with metadata describing a relationship between the particular content items as linked content items within a hierarchical structure according to the linking; and
    wherein the content tethering component is configured to:
    subsequently determine an event associated with the first content item and the second content item related as linked content items, indicative of at least one of searching within, modifying, or deleting the linked content items, by at least one of the second user or another user;
    communicate with the security component to determine a user permission for the at least one of the second user or another user to perform an action associated with the event and the linked content items; and
    responsive to the at least one of the second user or another user being permitted, perform the action associated with the event, and notify users associated with the linked content items, including both the first user and the second user, of the event;
    wherein the event indicates a modification of a linked content item to create a modified version, or a request to delete at least one of a linked content item or link associated with the linked content item:
        the metadata associated with the linked content item is updated to include a user identifier of a modifying user or requesting user, and a date and time of the modification of the linked content item or the request to delete the linked content item or link associated therewith, and
        the system notifies each of the users associated with the linked content item, including the first user and the second user, of the modified version, or upon deletion of the linked content item or link associated therewith that the link has been broken.

2. The system of claim 1, wherein at least one of the linked content items is indicated as a parent content item, and at least one of the linked content items is indicated as a child of the parent content item.

3. The system of claim 1, wherein the event includes at least one of a modification or deletion of a linked content item.

4. The system of claim 1, wherein the content tethering component is further configured to validate a user associated with the indication to link content items, before or during association of the linked content items, based on a security data.

5. The system of claim 1, wherein the content tethering component is an independent module configured to be plugged in to the content management system.

6. The system of claim 1, wherein the content management system is configured to operate in a cloud environment.

7. The system of claim 1, wherein the content tethering component is further configured to generate metadata describing relationships between content items, and transmit the data to the content management system for inclusion as part of the metadata for linked content items.

8. The system of claim 1, wherein the event indicates modification of the linked content item;
    and
    wherein the system notifies each of the users associated with the linked content items of the modified version.

9. The system of claim 1, wherein the event indicates a request to delete the linked content item or link associated therewith;
    and
    whereupon deletion of the linked content item or link associated therewith, the system notifies each of the users associated with the linked content items that the link has been broken.

10. A method for enabling content tethering for a content management system, the method comprising:
    storing, at a server including a processor and a content management system, a plurality of content items associated with a plurality of users and accessible by a plurality of client devices;
    receiving, from a client device associated with a first user, an indication to link particular content items of the plurality of content items, including a first content item received from a first user, and a second content item received from a second user;
    communicating with a content management system that provides a security data including user permissions and privileges with respect to the plurality of content items, and actions associated with those content items, to determine a user permission for the first user to link the first content item with the second content item;
    responsive to the first user being permitted, associating the particular content items including each of the first content item and the second content item, with metadata describing a relationship between the particular content items as linked content items within a hierarchical structure according to the linking;
    subsequently determining an event associated with the first content item and the second content item related as linked content items, indicative of at least one of searching within, modifying, or deleting the linked content items, by at least one of the second user or another user;
    communicating with the content management system to determine a user permission for the at least one of the second user or another user to perform an action associated with the event and the linked content items; and
    responsive to the at least one of the second user or another user being permitted, performing the action associated with the event, and notifying users associated with the linked content items, including both the first user and the second user, of the event;

wherein the event indicates a modification of a linked content item to create a modified version, or a request to delete at least one of a linked content item or link associated with the linked content item:

updating the metadata associated with the linked content item to include a user identifier of a modifying user or requesting user, and a date and time of the modification of the linked content item or the request to delete the linked content item or link associated therewith, and notifying each of the users associated with the linked content item, including the first user and the second user, of the modified version, or upon deletion of the linked content item or link associated therewith that the link has been broken.

11. The method of claim 10, further comprising indicating at least one of the linked content items as a parent content item, and indicating at least one of the linked content items as a child of the parent content item.

12. The method of claim 10, wherein the event includes at least one of a modification or deletion of a linked content item.

13. The method of claim 10, further comprising validating a user associated with the indication to link content items, before or during association of the linked content items, based on a security data.

14. The method of claim 10, further comprising configuring the content management system to operate in a cloud environment.

15. The method of claim 10, wherein the event indicates modification of the linked content item, notifying each of the users associated with the linked content items of the modified version.

16. The method of claim 10, wherein the event indicates a request to delete the linked content item or link associated therewith, upon deletion of the linked content item or link associated therewith, notifying each of the users associated with the linked content items that the link has been broken.

17. A non-transitory computer readable storage medium, including instructions stored therein which when executed by a mobile device including a processor perform a method comprising:

storing, at a server including a processor and a content management system, a plurality of content items associated with a plurality of users and accessible by a plurality of client devices;

receiving, from a client device associated with a first user, an indication to link particular content items of the plurality of content items, including a first content item received from a first user, and a second content item received from a second user;

communicating with a content management system that provides a security data including user permissions and privileges with respect to the plurality of content items, and actions associated with those content items, to determine a user permission for the first user to link the first content item with the second content item;

responsive to the first user being permitted, associating the particular content items including each of the first content item and the second content item, with metadata describing a relationship between the particular content items as linked content items within a hierarchical structure according to the linking;

subsequently determining an event associated with the first content item and the second content item related as linked content items, indicative of at least one of searching within, modifying, or deleting the linked content items, by at least one of the second user or another user;

communicating with the content management system to determine a user permission for the at least one of the second user or another user to perform an action associated with the event and the linked content items; and responsive to the at least one of the second user or another user being permitted, performing the action associated with the event, and notifying users associated with the linked content items, including both the first user and the second user, of the event;

wherein the event indicates a modification of a linked content item to create a modified version, or a request to delete at least one of a linked content item or link associated with the linked content item:

updating the metadata associated with the linked content item to include a user identifier of a modifying user or requesting user, and a date and time of the modification of the linked content item or the request to delete the linked content item or link associated therewith, and notifying each of the users associated with the linked content item, including the first user and the second user, of the modified version, or upon deletion of the linked content item or link associated therewith that the link has been broken.

18. The non-transitory computer readable storage medium of claim 17, further comprising configuring the content management system to operate in a cloud environment.

19. The non-transitory computer readable storage medium of claim 17, wherein the event indicates modification of the linked content item, notifying each of the users associated with the linked content items of the modified version.

20. The non-transitory computer readable storage medium of claim 17, wherein the event indicates a request to delete the linked content item or link associated therewith, upon deletion of the linked content item or link associated therewith, notifying each of the users associated with the linked content items that the link has been broken.

* * * * *